United States Patent
Takagai et al.

(10) Patent No.: US 9,950,593 B2
(45) Date of Patent: Apr. 24, 2018

(54) DOOR STRUCTURE OF VEHICLE

(71) Applicant: Honda Motor Co.,Ltd., Tokyo (JP)

(72) Inventors: Hiroyuki Takagai, Saitama (JP); Atsushi Noto, Tokyo (JP); Osamu Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/441,257

(22) Filed: Feb. 24, 2017

(65) Prior Publication Data

US 2017/0246936 A1    Aug. 31, 2017

(30) Foreign Application Priority Data

Feb. 25, 2016  (JP) ................................ 2016-034529

(51) Int. Cl.
*B60J 5/04* (2006.01)

(52) U.S. Cl.
CPC ........... *B60J 5/0437* (2013.01); *B60J 5/0429* (2013.01); *B60J 5/0443* (2013.01); *B60J 5/0456* (2013.01)

(58) Field of Classification Search
CPC ...... B60J 5/0425; B60J 5/0427; B60J 5/0437; B60J 5/0443; B60J 5/0429; B60J 5/0456
USPC ...................................... 296/146.6
See application file for complete search history.

(56) References Cited

U.S. PATENT DOCUMENTS

| 2005/0001448 A1* | 1/2005 | Omori | B60J 5/0431 |
| | | | 296/146.7 |
| 2008/0007087 A1* | 1/2008 | Endo | B60J 5/0426 |
| | | | 296/187.01 |
| 2010/0148535 A1* | 6/2010 | Takahashi | B60J 5/0426 |
| | | | 296/187.12 |
| 2014/0132029 A1* | 5/2014 | Kuroki | B60J 5/0429 |
| | | | 296/146.6 |
| 2015/0258878 A1* | 9/2015 | Sugiyama | B60J 5/0429 |
| | | | 49/505 |
| 2016/0059677 A1* | 3/2016 | Yamazaki | B60J 5/0429 |
| | | | 49/501 |

(Continued)

FOREIGN PATENT DOCUMENTS

| JP | H0411114 | 1/1992 |
| JP | H07017253 | 1/1995 |

(Continued)

OTHER PUBLICATIONS

"Office Action of Japan Counterpart Application," with machine English translation thereof, dated Sep. 26, 2017, p. 1-p. 7.

*Primary Examiner* — Gregory A Blankenship
(74) *Attorney, Agent, or Firm* — JCIPRNET (57) ABSTRACT

A door structure of a vehicle, capable of reliably transmitting a load, is provided. A rear side door (1) includes an inner panel (2) and an elongated door beam (4) that is attached to an outer side of the inner panel (2) in a vehicle width direction of a vehicle body and arranged along a front-rear direction of the vehicle body. The door beam (4) includes a first plate portion (11) of a first bracket (10), which has a first surface intersecting an axis along the vehicle width direction, and a vehicle width direction plate portion (21) of a second bracket (20), which has a second surface intersecting an axis along the front-rear direction of the vehicle body. The door beam (4) is joined to the inner panel (2) via both the first plate portion (11) and a second plate portion (12).

3 Claims, 6 Drawing Sheets

(56) References Cited

U.S. PATENT DOCUMENTS

| | | | | |
|---|---|---|---|---|
| 2016/0159207 A1* | 6/2016 | Ogawa | ............... | B60J 5/0427 |
| | | | | 49/504 |
| 2016/0288629 A1* | 10/2016 | Hu | ................ | B22D 17/00 |
| 2017/0036521 A1* | 2/2017 | Ogawa | ............... | B60J 5/0456 |
| 2017/0240031 A1* | 8/2017 | Moriyama | ............ | B60J 5/0412 |
| 2017/0246936 A1* | 8/2017 | Takagai | ............... | B60J 5/0437 |

FOREIGN PATENT DOCUMENTS

| | | |
|---|---|---|
| JP | H09202138 | 8/1997 |
| JP | H09272387 | 10/1997 |
| JP | 2013154784 | 8/2013 |

\* cited by examiner

DOOR STRUCTURE OF VEHICLE

CROSS-REFERENCE TO RELATED APPLICATION

This application claims the priority benefit of Japan application serial no. 2016-034529, filed on Feb. 25, 2016. The entirety of the above-mentioned patent application is hereby incorporated by reference herein and made a part of this specification.

BACKGROUND OF THE INVENTION

Field of the Invention

The invention relates to a door structure of a vehicle.

Description of Related Art

There is a conventional side door which includes a pipe bar, and when a load is applied from a lateral side of the door of the vehicle, the pipe bar transmits the applied load to an inner panel of the door (refer to Patent Literature 1, for example). The side door includes the pipe bar therein that is arranged along the front-rear direction, and an end surface of the pipe bar (door beam) is connected to the inner panel via a bracket.

PRIOR ART LITERATURE

Patent Literature

Patent Literature 1: Utility Model Application Publication No. H4-11114

SUMMARY OF THE INVENTION

Problem to be Solved

However, according to the technology disclosed by the Patent Literature 1 described above, when the load applied from the lateral side of the vehicle is large, the bracket may peel off from the inner panel and cause that the load applied on the pipe bar cannot be transmitted to the inner panel.

The invention provides a door structure of a vehicle, which is capable of reliably transmitting the load.

Solution to the Problem (1) In view of the above, a door structure of a vehicle according to an embodiment of the invention includes a door (the rear side door 1 of the embodiment, for example) for opening and closing an opening formed in a vehicle body. The door includes an inner panel (the inner panel 2 of the embodiment, for example) and an elongated door beam (the door beam 4 of the embodiment, for example) that is attached to an outer side of the inner panel in a vehicle width direction of the vehicle body and arranged along a front-rear direction of the vehicle body. The door beam includes a first surface member (the first plate portion 11 of the first bracket 10 of the embodiment, for example) and a second surface member (the vehicle width direction plate portion 21 of the second bracket 20 of the embodiment, for example), wherein the first surface member has a first surface that intersects an axis along the vehicle width direction and the second surface member has a second surface that intersects an axis along the front-rear direction of the vehicle body. The door beam is joined to the inner panel via both the first surface and the second surface.

(2) Further, in the door structure of the vehicle according to an embodiment of the invention, a patch member (the patch member 60 of the embodiment, for example) respectively joined to the first surface and the second surface may be disposed on an inner side in the vehicle width direction with respect to the inner panel.

(3) Further, in the door structure of the vehicle according to an embodiment of the invention, the inner panel may have an inner panel first surface (the first contact portion 2A of the inner panel 2 of the embodiment, for example) arranged substantially in parallel to the first surface, an inner panel second surface (the second contact portion 2B of the inner panel 2 of the embodiment, for example) arranged substantially in parallel to the second surface, and an inner panel connecting portion (the inner panel connecting portion 2C of the embodiment, for example) connecting the inner panel first surface and the inner panel second surface. The patch member may have a patch first surface (the patch first member 61 of the patch member 60 of the embodiment, for example) arranged substantially in parallel to the inner panel first surface, a patch second surface (the patch second member 62 of the patch member 60 of the embodiment, for example) arranged substantially in parallel to the inner panel second surface, and a patch connecting portion (the patch connecting portion 63 of the embodiment, for example) connecting the patch first surface and the patch second surface. The first surface, the inner panel first surface, and the patch first surface may be joined. The second surface, the inner panel second surface, and the patch second surface may be joined. The patch connecting portion may be disposed apart from the inner panel connecting portion.

(4) Further, in the door structure of the vehicle according to an embodiment of the invention, a first bracket (the first bracket 10 of the embodiment, for example) having the first surface and a second bracket (the second bracket 20 of the embodiment, for example) having the second surface may be respectively connected to the door beam. The first bracket, the second bracket, and the door beam may be joined on a surface that intersects the axis along the vehicle width direction.

(5) Further, in the door structure of the vehicle according to an embodiment of the invention, a third bracket (the third bracket 30 of the embodiment, for example) may be disposed between the door beam and the inner panel, and the door structure of the vehicle may include: a first joining member (the first joining member 73 of the embodiment, for example) joining the door beam, the third bracket, and the inner panel; and a second joining member (the second joining member 74 of the embodiment, for example) joining the third bracket and the inner panel at a position extending from the first joining member along a longitudinal direction of the door beam.

(6) Further, in the door structure of the vehicle according to an embodiment of the invention, the door may include an outer panel (the outer panel 5 of the embodiment, for example) disposed on the outer side of the inner panel and a fourth bracket (the fourth bracket 40 of the embodiment, for example) in contact with the outer panel between the inner panel and the outer panel. The fourth bracket may be located at a maximum distance from the inner panel and the outer panel in the vehicle width direction.

Effects of the Invention

According to the configuration (1) described above, the door beam is joined to the inner panel via both the first surface of the first surface member and the second surface of the second surface member. In addition, the first surface member and the second surface member are arranged at different angles, and the door beam is joined on two surfaces at different angles. Thus, when a load is applied from the lateral side of the vehicle, the input load from the door beam is applied on the joined portions in two directions, i.e., a shearing direction of the door beam and a pulling direction. Therefore, the load can be reliably and stably received, as compared with the case where the door beam is joined on only one surface. Accordingly, the load can be reliably transmitted.

According to the configuration (2) described above, the door is provided with the patch member that is respectively joined to the first surface and the second surface. Without the patch member, one or both of the first surface and the second surface may break from the joined portions when a large load is applied. Regarding this, the patch member respectively joined to the first surface and the second surface is disposed on the vehicle inner side of the inner panel. Hence, the inner panel and the patch member can coordinate to receive the load. Accordingly, breakage from the joined portions can be prevented, so as to receive the load reliably and stably.

According to the configuration (3) described above, the inner panel first surface and the patch first surface, and the inner panel second surface and the patch second surface are respectively joined to each other. In this case, if the patch connecting portion and the inner panel connecting portion are in contact with each other, it is necessary to considerably increase the molding accuracy of the patch member. If the molding accuracy is low, the joint becomes unstable, and the load may not be received reliably.

Regarding this, the patch connecting portion and the inner panel connecting portion are spaced apart from each other. Therefore, the inner panel first surface and the patch first surface, and the inner panel second surface and the patch second surface can be respectively joined to each other without high molding accuracy. Hence, the load can be received reliably. Even if the inner panel is deformed to be opened due to the load applied thereon, since the patch connecting portion and the inner panel connecting portion are spaced apart from each other, the patch member can be suppressed from deforming in the same way as the inner panel, and as a result, deformation of the inner panel can be suppressed.

According to the configuration (4) described above, the first bracket, the second bracket, and the door beam are joined on the surfaces that intersect the axis along the vehicle width direction. Thus, when a load is applied from the lateral side, the load can be received efficiently. In addition, by forming the first surface and the second surface on different brackets, i.e., the first bracket 10 and the second bracket 20, the load is less likely to concentrate on one surface. Accordingly, breakage from the joined portions can be prevented, so as to receive the load reliably and stably.

According to the configuration (5) described above, the first joining member joins the door beam, the third bracket, and the inner panel while the second joining member joins the third bracket and the inner panel. Thus, the inner panel is reinforced by the third bracket, and the load from the door beam is transmitted from the first joining member to the third bracket and the inner panel and is not directly transmitted to the second joining member. Accordingly, since the bearing capacity of each member can be fully utilized, the load can be received reliably and stably with the minimum umber of members.

According to the configuration (6) described above, the fourth bracket is located at the maximum distance from the inner panel and the outer panel in the vehicle width direction. Thereby, deformation of the outer panel, which occurs first when a load is applied from the lateral side, can be efficiently suppressed by the fourth bracket, so as to reduce the load on the door beam. Vibration of the outer panel during running can be suppressed as well.

DESCRIPTION OF THE EMBODIMENTS

Hereinafter, an embodiment of the invention is described with reference to the figures. In the following description, the term is "front," "rear," "top," "bottom," "left," and "right" refer to the "front," "rear," "top," "bottom," "left," and "right" with respect to a vehicle unless otherwise specified.

Figure 1:
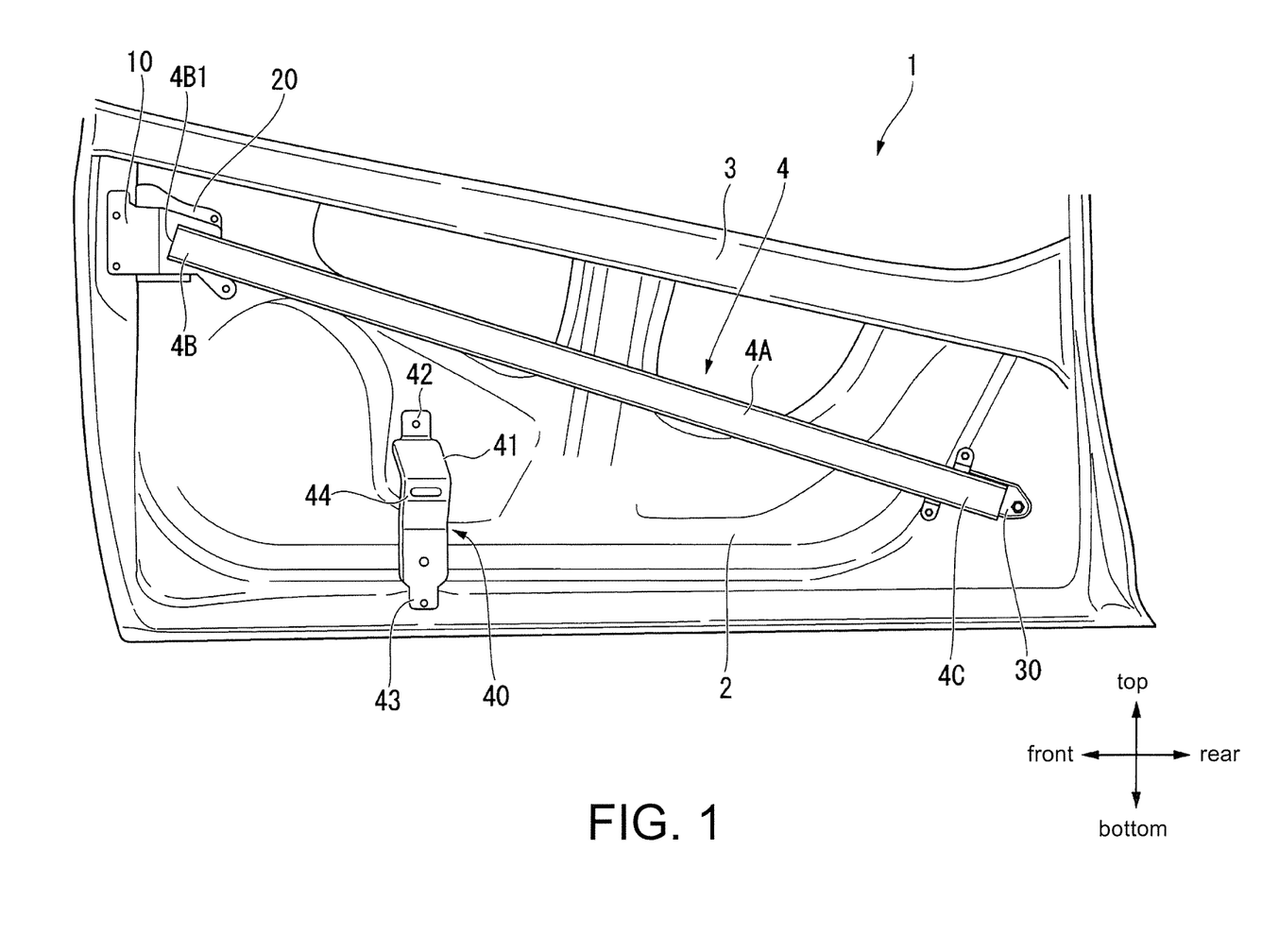
FIG. 1 is a side view of the door structure of the vehicle.
Figure 2:
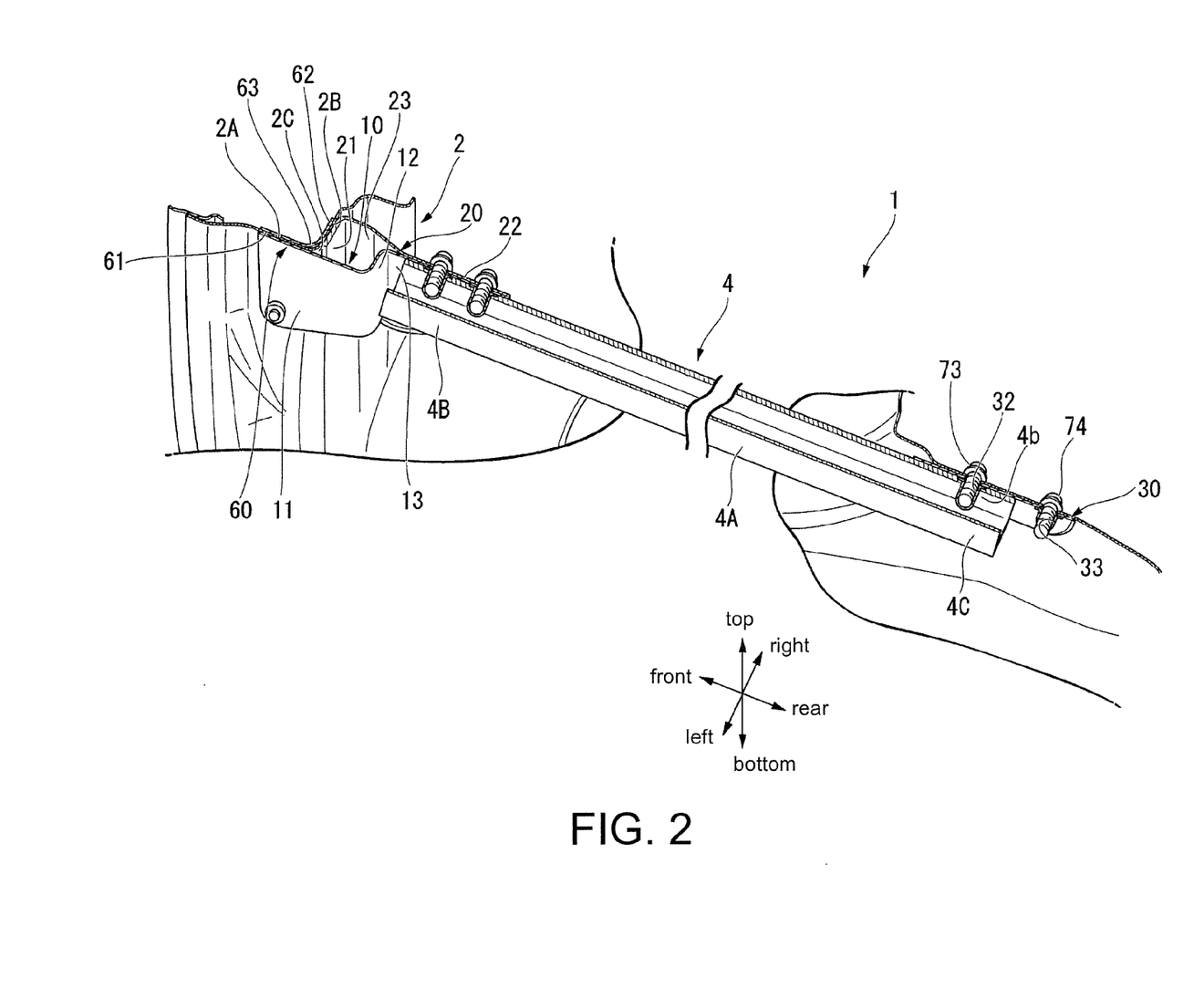
FIG. 2 is a partially omitted perspective view of the door structure of the vehicle.
Figure 3:
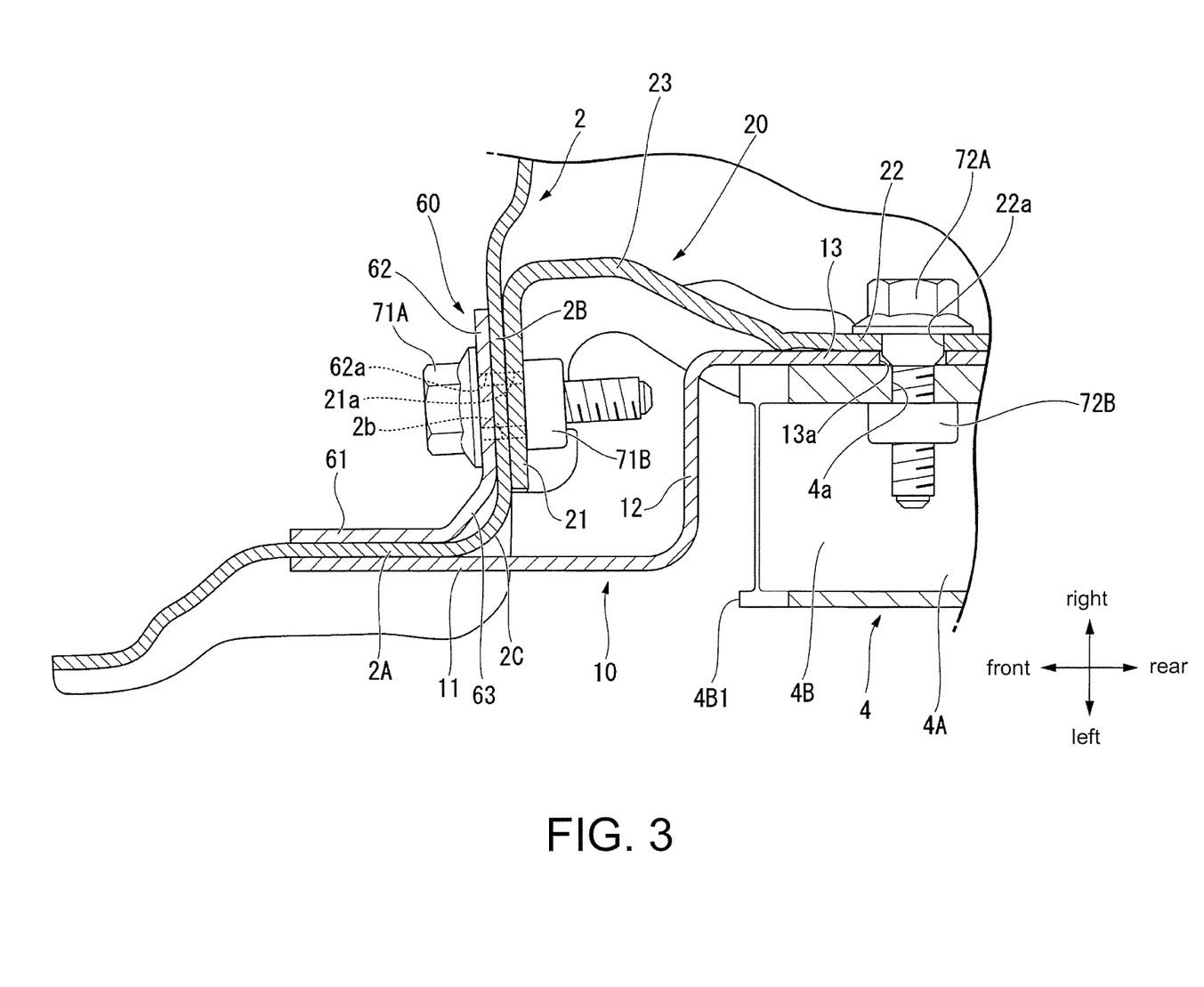
FIG. 3 is a plan cross-sectional view of the vicinity of the front end portion of the door structure of the vehicle.
Figure 4:
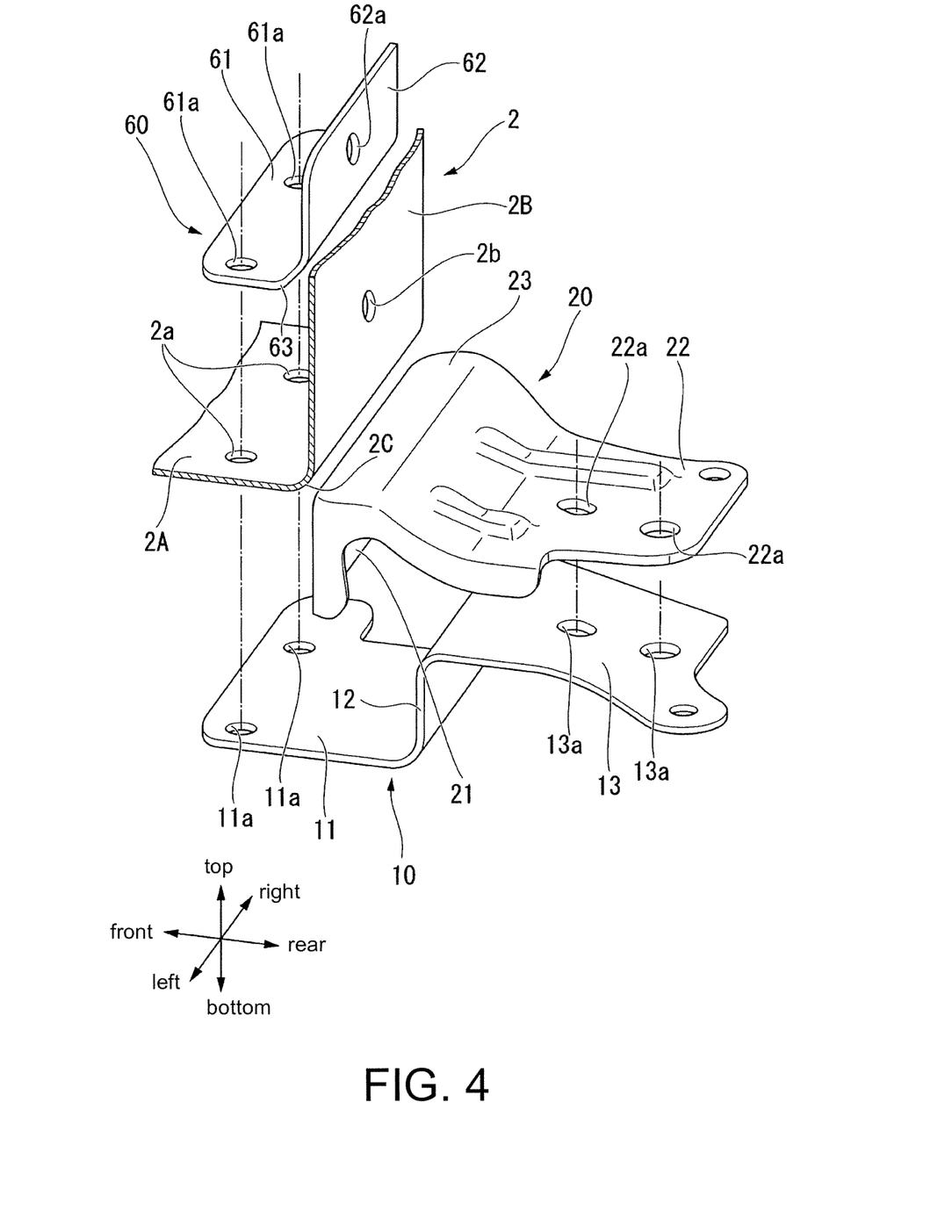
FIG. 4 is an exploded perspective view of main parts of the door structure of the vehicle.
Figure 5A:
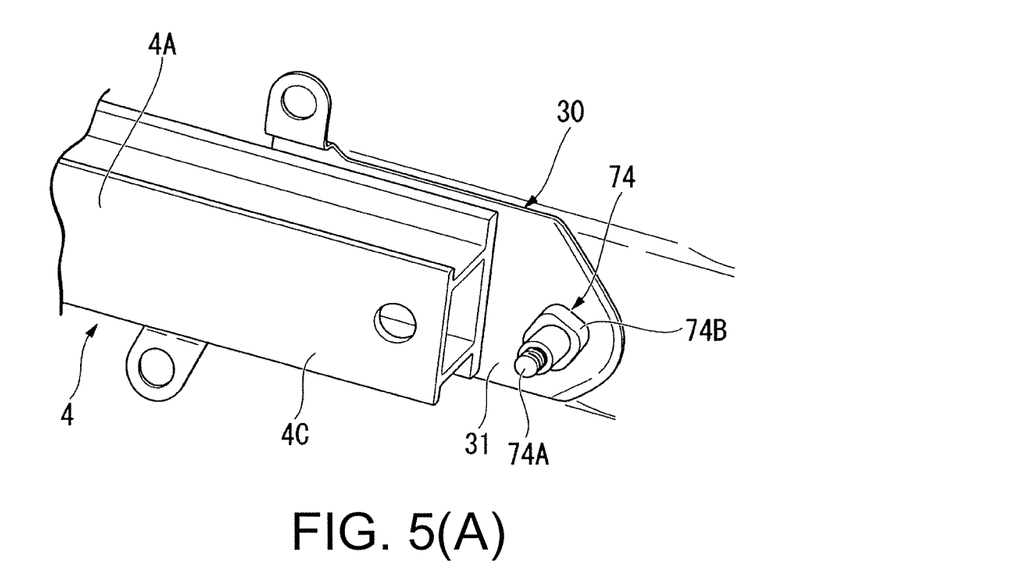
FIG. 5(A) is a perspective view of the vicinity of the rear end portion of the door beam.
Figure 5B:
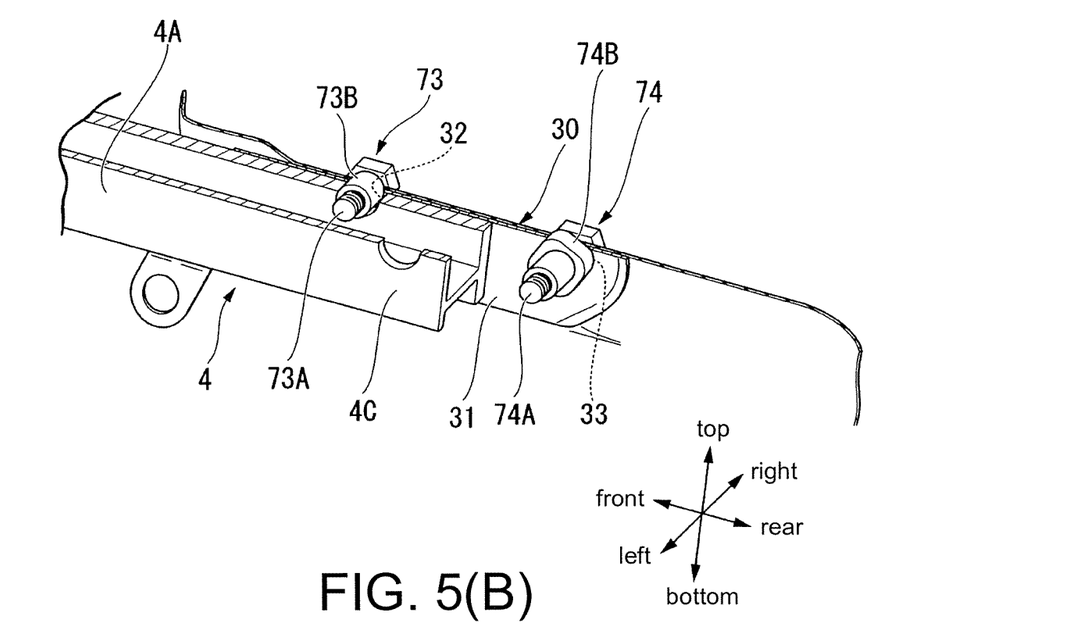
FIG. 5(B) is a cross-sectional view of the vicinity of the rear end portion of the door beam.
Figure 6:
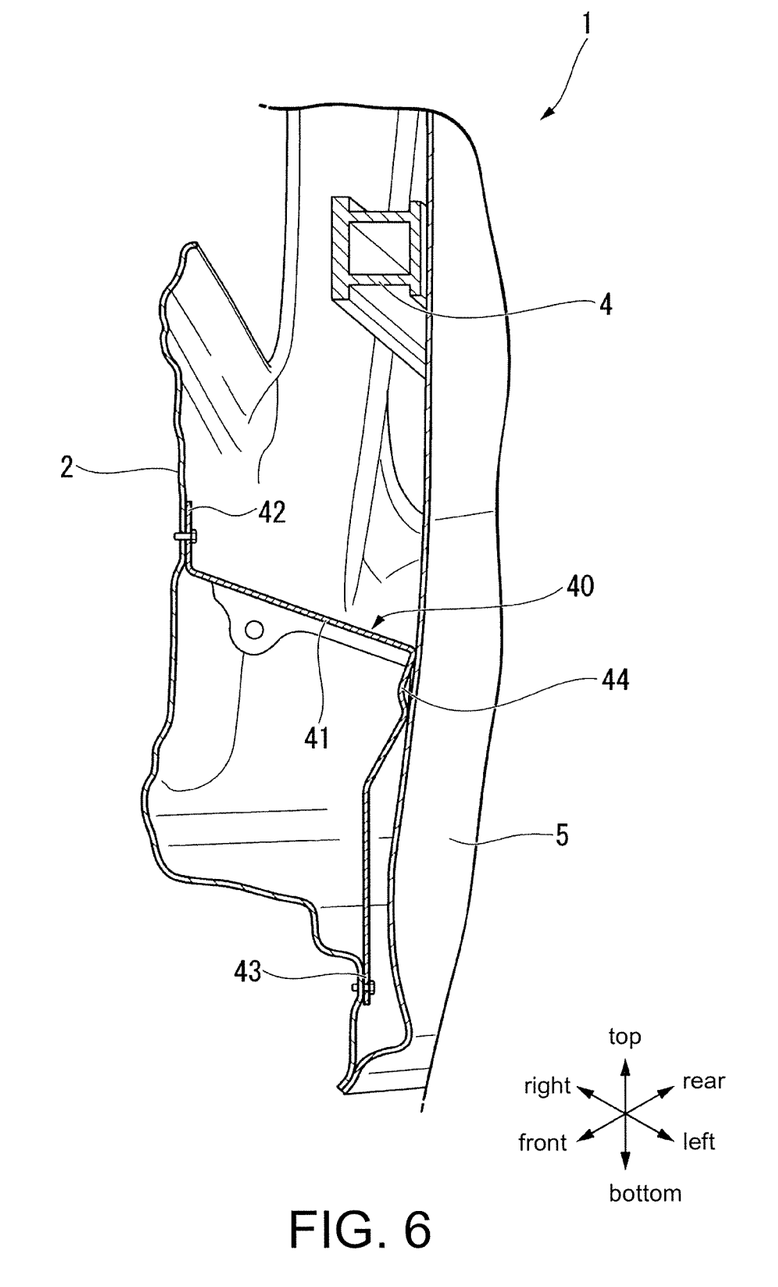
FIG. 6 is a front cross-sectional view of the vicinity of the fourth bracket.

FIG. 1 is a side view of a vehicle that uses a door structure according to an embodiment of the invention. FIG. 1 illustrates a state where an outer panel of a rear side door has been removed. FIG. 2 is a partially omitted perspective view of the door structure of the vehicle. FIG. 3 is a plan cross-sectional view of the vicinity of a front end portion of a door beam. FIG. 4 is an exploded perspective view of the vicinity of the front end portion of the door beam. FIG. 5(A) is a perspective view of the vicinity of a rear end portion of the door beam and FIG. 5(B) is a cross-sectional view of the vicinity of the rear end portion of the door beam. FIG. 6 is a front cross-sectional view of the vicinity of a fourth bracket.

As shown in FIG. 1, the rear side door 1 of the vehicle according to an embodiment is for opening and closing a rear side opening that is formed in a vehicle body (not shown). A metal part of the vehicle including the rear side door 1 is composed of a lightweight nonferrous metal, e.g., aluminum. Nevertheless, a part or all of the metal part may be composed of a metal, e.g., iron, other than aluminum.

The rear side door 1 includes an inner panel 2, and the inner panel 2 includes a reinforcing member 3. The reinforcing member 3 is an elongated member formed along a front-rear direction of the vehicle. A door beam 4 is attached below the reinforcing member 3 of the inner panel 2. The door beam 4 includes an elongated door beam main body 4A, a first bracket 10, and a second bracket 20. The door beam main body 4A is arranged in the front-rear direction of the vehicle. The first bracket 10 and the second bracket 20 are joined to a front end portion 4B of the door beam main body 4A.

The door beam main body 4A is a hollow elongated member. The front end portion 4B of the door beam main body 4A is joined to the inner panel 2 via the first bracket 10 and the second bracket 20. In addition, the outer panel 5 (refer to FIG. 6) is disposed on an outer side of the inner panel 2 in a vehicle width direction. The outer panel 5 forms a design surface of the rear side door 1.

As shown in FIG. 2 and FIG. 3, the front end portion 4B of the door beam main body 4A of the door beam 4 is joined to the inner panel 2 via the first bracket 10 and the second bracket 20, and a rear end portion 4C of the door beam main body 4A is joined to the inner panel 2 via a third bracket 30. Moreover, a fourth bracket 40 is disposed below the door beam 4.

On the side of the front end portion 4B of the door beam main body 4A, as further shown in FIG. 4, the first bracket 10, the second bracket 20, the inner panel 2, and a patch member 60 are disposed to overlap one another. Among these, the first bracket 10 includes a first plate portion 11, a second plate portion 12, and a third plate portion 13. The first plate portion 11 is a first surface member having a first surface in a direction that intersects an axis along the vehicle width direction. Here, the first surface is orthogonal or substantially orthogonal to the axis along the vehicle width direction. Further, the second plate portion 12 is arranged along a direction that intersects an axis along the front-rear direction. Here, the second plate portion 12 is arranged along a direction orthogonal or substantially orthogonal to the axis along the front-rear direction. The third plate portion 13 is arranged along a direction that intersects the axis along the vehicle width direction. Here, the third plate portion 13 is arranged along the direction orthogonal or substantially orthogonal to the axis along the vehicle width direction. The first plate portion 11, the second plate portion 12, and the third plate portion 13 are integrally formed.

The second bracket 20 is disposed entirely on the inner side of the first bracket 10 in the vehicle width direction. The second bracket 20 includes a vehicle width direction plate portion 21 and a front-rear direction plate portion 22 that is disposed on the rear side of the vehicle width direction plate portion 21. The second bracket 20 further includes a connecting portion 23 that is interposed between the vehicle width direction plate portion 21 and the front-rear direction plate portion 22 and connects the vehicle width direction plate portion 21 and the front-rear direction plate portion 22. The vehicle width direction plate portion 21, the connecting portion 23, and the front-rear direction plate portion 22 are integrally formed. The vehicle width direction plate portion 21 is a second surface member having a second surface in a direction that intersects the axis along the front-rear direction. Here, the second surface is orthogonal or substantially orthogonal to the axis along the front-rear direction. In addition, the front-rear direction plate portion 22 is arranged along a direction that intersects the axis along the vehicle width direction. Here, the front-rear direction plate portion 22 is arranged along the direction orthogonal or substantially orthogonal to the axis along the vehicle width direction.

The first bracket 10 and the second bracket 20 are disposed in contact with the inner panel 2. A first contact portion 2A, which is a position of the inner panel 2 in contact with the first bracket 10 and has an inner panel first surface, is formed into a plate shape along the front-rear direction. A second contact portion 2B, which is a position in contact with the second bracket 20 and has an inner panel second surface, is formed into a plate shape along the vehicle width direction. Therefore, the first contact portion 2A and the second contact portion 2B are arranged substantially orthogonally.

The first contact portion 2A and the second contact portion 2B of the inner panel 2 are connected via an inner panel connecting portion 2C. The inner panel connecting portion 2C is curved so that a cross section thereof has a substantially arc shape. Moreover, the first contact portion 2A of the inner panel 2 is disposed on the inner side in the vehicle width direction with respect to the first plate portion 11 of the first bracket 10 and the second contact portion 2B is disposed on the front side of the vehicle width direction plate portion 21 of the second bracket 20.

The patch member 60 is disposed on the inner side of the first contact portion 2A of the inner panel 2 in the vehicle width direction and on the front side of the second contact portion 2B. The patch member 60 includes a patch first member 61 and a patch second member 62. The patch first member 61 has a patch first surface extending in the front-rear direction and the patch second member 62 has a patch second surface extending in the vehicle width direction. Furthermore, the patch first member 61 and the patch second member 62 are connected by a patch connecting portion 63. The patch first member 61, the patch second member 62, and the patch connecting portion 63 are integrally formed.

The patch connecting portion 63 has a substantially rectangular cross section, and a connection part between the patch connecting portion 63 and the patch first member 61 has an angular cross section. Likewise, a connection part between the patch connecting portion 63 and the patch second member 62 has an angular cross section. Therefore, although the patch first member 61 and the patch second member 62 of the patch member 60 are respectively in contact with the first contact portion 2A and the second contact portion 2B of the inner panel 2, the patch connecting portion 63 and the inner panel connecting portion 2C are separated from each other.

An inner plate front end portion 4B1, which corresponds to the front end portion 4B among the plate portions disposed on the inner side of the door beam main body 4A in the vehicle width direction, the third plate portion 13 of the first bracket 10, and the front-rear direction plate portion 22 of the second bracket 20 are arranged in parallel to one another. A through hole 4a is formed in the inner plate front end portion 4B1 of the door beam main body 4A. In addition, through holes 13a and 22a are formed in the third plate portion 13 of the first bracket 10 and the front-rear direction plate portion 22 of the second bracket 20 respectively. The door beam main body 4A, the first bracket 10, and the second bracket 20 are fastened and joined by a bolt 72A that passes through the through holes 4a, 13a, and 22a and a nut 72B that is fastened to a threaded portion of the bolt 72A. The threaded portion of the bolt 72A and the nut 72B are housed in the hollow portion of the door beam main body 4A.

The first plate portion 11 of the first bracket 10, the first contact portion 2A of the inner panel 2, and the patch first member 61 of the patch member 60 are arranged substantially in parallel to one another. The "substantially in parallel" not only refers to a completely parallel state but also refers to a nearly parallel state where the surfaces can overlap one another. Furthermore, a through hole 11a is formed in the first plate portion 11 of the first bracket 10. Through holes 2a and 61a are formed in the first contact portion 2A of the inner panel 2 and the patch first member 61 of the patch member 60 respectively. The first bracket 10, the first contact portion 2A of the inner panel 2, and the patch member 60 are fastened and joined by a bolt and a nut (not shown) that pass through the through holes 11a, 2a, and 61a.

The vehicle width direction plate portion 21 of the second bracket 20, the second contact portion 2B of the inner panel 2, and the patch second member 62 of the patch member 60 are arranged substantially in parallel to one another. A through hole 21a is formed in the vehicle width direction plate portion 21 of the second bracket 20. Besides, through holes 2b and 62a are formed in the second contact portion 2B of the inner panel 2 and the patch second member 62 of the patch member 60 respectively. The second bracket 20, the second contact portion 2B of the inner panel 2, and the patch member 60 are fastened and joined by a bolt 71A that passes through the through holes 21a, 2b, and 62a and a nut 71B that is fastened to a threaded portion of the bolt 71A. Therefore, the door beam main body 4A, the first bracket 10, and the second bracket 20 are all joined on the surfaces that intersect (for example, orthogonal or substantially orthogonal to) the axis along the vehicle width direction.

The first plate portion 11 of the first bracket 10 and the connecting portion 23 of the second bracket 20 are spaced apart from each other, and the vehicle width direction plate portion 21 of the second bracket 20 and the second plate portion 12 of the first bracket 10 are spaced apart from each other. Therefore, a space is formed in a portion surrounded by the first plate portion 11 and the second plate portion 12 of the first bracket 10, and the vehicle width direction plate portion 21 and the connecting portion 23 of the second bracket 20. The threaded portion of the bolt 71A and the nut 71B are housed in this space.

As shown in FIG. 1, the third bracket 30 is interposed between the rear end portion 4C of the door beam main body 4A and the inner panel 2. As shown in FIG. 5(A) and FIG. 5(B), the third bracket 30 includes a plate member 31. A front through hole 32 is formed at a front position of the plate member 31, as shown in FIG. 5(B), and a rear through hole 33 is formed at a rear position.

The rear end portion 4C of the door beam main body 4A overlaps the front position of the plate member 31 of the third bracket 30. In the rear position of the plate member 31, the rear end portion 4C of the door beam main body 4A does not overlap the plate member 31 so that the plate member 31 is exposed. Moreover, a beam side rear through hole 4b is formed at a position of the rear end portion 4C of the door beam main body 4A, which overlaps the third bracket 30.

The third bracket 30 is fastened and joined by a first joining member 73, which includes a first joining bolt 73A that passes through the front through hole 32 and a first joining nut 73B that is fastened to a threaded portion of the first joining bolt 73A. Moreover, the third bracket 30 is fastened and joined by a second joining member 74, which includes a second joining bolt 74A that passes through the rear through hole 33 and a second joining nut 74B that is fastened to a threaded portion of the second joining bolt 74A. The second joining bolt 74A and the second joining nut 74B of the second joining member 74 are disposed at a position extending from the first joining bolt 73A and the first joining nut 73B of the first joining member 73 along a longitudinal direction of the door beam main body 4A.

Among these, the first joining bolt 73A that passes through the front through hole 32 also passes through the beam side rear through hole 4b formed in the rear end portion 4C of the door beam main body 4A, such that the first joining bolt 73A and the first joining nut 73B jointly fasten the third bracket 30 and the door beam main body 4A. Thereby, the first joining member 73 joins the third bracket 30 to the inner panel 2 and joins the door beam main body 4A to the third bracket 30.

As shown in FIG. 1, the fourth bracket 40 is disposed below the door beam 4. The fourth bracket 40 is disposed between the inner panel 2 and the outer panel 5, as further shown in FIG. 6. The fourth bracket 40 includes a fourth bracket main body 41 having a substantially L-shaped front cross-sectional shape. An upper joining portion 42 is provided at an upper end portion of the fourth bracket main body 41 and a lower joining portion 43 is provided at a lower end portion of the fourth bracket main body 41. Furthermore, a protruding portion 44 that protrudes toward the outer side in the vehicle width direction is formed in the vicinity of a bent portion of the fourth bracket main body 41.

The upper joining portion 42 and the lower joining portion 43 of the fourth bracket 40 are joined to the inner panel 2 by a bolt and a nut (not shown) against an outer surface of the inner panel 2 in the vehicle width direction. The protruding portion 44 is in contact with an inner surface of the outer panel 5 in the vehicle width direction. It is joined to the outer panel 5 by welding. Moreover, the fourth bracket 40 is located at a maximum distance from the inner panel 2 in the vehicle width direction.

In the door structure of the vehicle according to this embodiment that has the configuration described above, the door beam 4 is joined to the inner panel 2 via both the first surface formed on the first plate portion 11 of the first bracket 10 and the second surface formed on the vehicle width direction plate portion 21 of the second bracket 20. In addition, the first plate portion 11 of the first bracket 10 and the vehicle width direction plate portion 21 of the second bracket 20 are arranged at different angles, and the door beam 4 is joined on two surfaces at different angles. Thus, when a load is applied from the lateral side of the vehicle, the input load from the door beam 4 is applied on the joined portions in two directions, i.e., a shearing direction of the door beam and a pulling direction. Therefore, the load can be reliably and stably received, as compared with the case where the door beam 4 is joined on only one surface. Accordingly, the load can be reliably transmitted.

Moreover, the rear side door 1 is provided with the patch member 60 that is respectively joined to the first surface of the first plate portion 11 of the first bracket 10 and the second surface of the vehicle width direction plate portion 21 of the second bracket 20. Without the patch member 60, one or both of the first surface of the first plate portion 11 and the second surface of the vehicle width direction plate portion 21 may break from the joined portions when a large load is applied on the rear side door 1. Regarding this, the patch member 60 respectively joined to the first surface of the first plate portion 11 and the second surface of the vehicle width direction plate portion 21 is disposed on the rear side door 1 on the vehicle inner side of the inner panel 2. Hence, the inner panel 2 and the patch member 60 can coordinate to receive the load. Accordingly, the first plate portion 11 and the patch member 60, and the vehicle width direction plate portion 21 and the patch member 60 can be prevented from breaking off from the joined portions, so that the load can be reliably and stably received.

In addition, the inner panel first surface of the first contact portion 2A and the patch first surface of the patch first member 61 of the patch member 60, and the inner panel second surface of the second contact portion 2B and the patch second surface of the patch second member 62 of the patch member 60 are respectively joined to each other. In this case, if the patch connecting portion 63 and the inner panel connecting portion 2C are in contact with each other, it is necessary to considerably increase the molding accuracy of the patch member 60. If the molding accuracy is low, the joint becomes unstable, and the load may not be received reliably. Regarding this, the patch connecting portion 63 and the inner panel connecting portion 2C are spaced apart from each other. Therefore, the inner panel first surface of the first contact portion 2A and the patch first surface of the second contact portion 2B, and the inner panel second surface and the patch second surface can be respectively joined to each other without high molding accuracy. Hence, the load can be received reliably. Even if the inner panel 2 is deformed to be opened due to the load applied thereon, since the patch connecting portion 63 and the inner panel connecting portion 2C are spaced apart from each other, the patch member 60 can be suppressed from deforming in the same way as the inner panel 2, and as a result, deformation of the inner panel 2 can be suppressed.

Further, the first bracket 10, the second bracket 20, and the door beam 4 are joined on the surfaces that intersect the axis along the vehicle width direction. Thus, when a load is applied from the lateral side of the rear side door 1, the load can be received efficiently. In addition, by forming the first surface on the first plate portion 11 of the first bracket 10 and forming the second surface on the vehicle width direction plate portion 21 of the second bracket 20 to put the first surface and the second surface on different brackets, the load from the door beam 4 is less likely to concentrate on one surface. Accordingly, breakage from the joined portions can be prevented, so as to receive the load reliably and stably.

Moreover, the first joining member 73 joins the door beam 4, the third bracket 30, and the inner panel 2 while the second joining member 74 joins the third bracket 30 and the inner panel 2. Thus, the inner panel 2 is reinforced by the third bracket 30, and the load from the door beam 4 is transmitted from the first joining member 73 to the third bracket 30 and the inner panel 2 and is not directly transmitted to the second joining member 74. Accordingly, since the bearing capacity of each member can be fully utilized, the load can be received reliably and stably with the minimum number of members.

Moreover, the fourth bracket 40 is located at the maximum distance from the inner panel 2 and the outer panel 5 in the vehicle width direction. Therefore, deformation of the outer panel 5, which occurs first when a load is applied from the lateral side of the rear side door 1, can be efficiently suppressed by the fourth bracket 40, so as to reduce the load on the door beam 4. Vibration of the outer panel 5 during running can be suppressed as well.

However, the invention is not limited to the embodiments described above and various modifications in design may be made without departing from the spirit of the invention. For example, the parts that are fastened and joined by bolts and nuts may be joined by welding instead.

What is claimed is:

1. A door structure of a vehicle, comprising a door for opening and closing an opening formed in a vehicle body, wherein:
   the door comprises an inner panel and an elongated door beam that is attached to an outer side of the inner panel in a vehicle width direction of the vehicle body and arranged along a front-rear direction of the vehicle body,
   the door beam comprises a first surface member and a second surface member, wherein the first surface member has a first surface that intersects an axis along the vehicle width direction and the second surface member has a second surface that intersects an axis along the front-rear direction of the vehicle body, and
   the door beam is joined to the inner panel via both the first surface and the second surface,
   wherein a patch member respectively joined to the first surface and the second surface is disposed on an inner side in the vehicle width direction with respect to the inner panel,
   wherein a first bracket having the first surface and a second bracket having the second surface are respectively connected to the door beam,
   wherein the first bracket, the second bracket, and the door beam are joined on a surface that intersects the axis along the vehicle width direction,
   wherein a third bracket is disposed between the door beam and the inner panel, and
   the door structure of the vehicle comprises:
       a first joining member joining the door beam, the third bracket, and the inner panel; and
       a second joining member joining the third bracket and the inner panel at a position extending from the first joining member along a longitudinal direction of the door beam.

2. The door structure of the vehicle according to claim 1, wherein the inner panel has an inner panel first surface arranged substantially in parallel to the first surface, an inner panel second surface arranged substantially in parallel to the second surface, and an inner panel connecting portion connecting the inner panel first surface and the inner panel second surface,
   the patch member has a patch first surface arranged substantially in parallel to the inner panel first surface, a patch second surface arranged substantially in parallel to the inner panel second surface, and a patch connecting portion connecting the patch first surface and the patch second surface,
   the first surface, the inner panel first surface, and the patch first surface are joined,
   the second surface, the inner panel second surface, and the patch second surface are joined, and
   the patch connecting portion is disposed apart from the inner panel connecting portion.

3. The door structure of the vehicle according to claim 1, wherein the door comprises an outer panel disposed on the outer side of the inner panel and a fourth bracket in contact with the outer panel between the inner panel and the outer panel, and
   the fourth bracket is located at a maximum distance from the inner panel and the outer panel in the vehicle width direction.

* * * * *